(12) United States Patent
Ichikawa

(10) Patent No.: US 6,200,518 B1
(45) Date of Patent: Mar. 13, 2001

(54) MELT-REDUCING FACILITY AND METHOD OF OPERATION THEREOF

(75) Inventor: Hiroshi Ichikawa, Kitakyushu (JP)

(73) Assignee: Nippon Steel Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,416
(22) PCT Filed: Jan. 24, 1997
(86) PCT No.: PCT/JP97/00166
  § 371 Date: Sep. 24, 1997
  § 102(e) Date: Sep. 24, 1997
(87) PCT Pub. No.: WO97/27336
  PCT Pub. Date: Jul. 31, 1997

(30) Foreign Application Priority Data

Jan. 26, 1996 (JP) .................................................. 8-011608

(51) Int. Cl.⁷ ............................... C21B 13/00; C21B 7/22
(52) U.S. Cl. ............................ 266/44; 266/155; 266/156
(58) Field of Search .................................. 266/155, 158, 266/159, 144, 44, 156

(56) References Cited

U.S. PATENT DOCUMENTS

| | | | |
|---|---|---|---|
| 3,060,014 | 10/1962 | Aihara | 266/155 |
| 3,320,931 | 5/1967 | Durham | 266/155 |
| 3,985,544 | 10/1976 | Collin et al. | |
| 4,451,291 | 5/1984 | Leiponen | 266/155 |

FOREIGN PATENT DOCUMENTS

| | | |
|---|---|---|
| 3 33 42 21 | 3/1985 | (DE) . |
| 35 487 | 9/1981 | (EP) . |
| 63-65007 | 3/1988 | (JP) . |
| 63-65011 | 3/1988 | (JP) . |
| 1-502276 | 8/1989 | (JP) . |
| 4-311632 | 11/1992 | (JP) . |
| 8-28353 | 1/1996 | (JP) . |

OTHER PUBLICATIONS

Patent Abstracts of Japan, vol. 13, No. 379 (C–628), Aug. 22, 1989 & JP 01 129914 A (Kawasaki Heavy Ind), May 23, 1989.

*Primary Examiner*—Scott Kastler
(74) *Attorney, Agent, or Firm*—Kenyon & Kenyon (57) ABSTRACT

A melt-reducing facility for directly producing molten iron or molten pig iron by throwing iron bearing material, carbon material and flux into furnace bodies and blowing pure oxygen and/or an oxygen-rich gas therein, wherein a waste heat boiler and a power-generating facility are connected to a plurality of furnace bodies through ducts which can be freely opened and closed, the waste heat boiler being capable of recovering by vaporization the sensible heat and the latent heat of the combustible gases generated from the furnace bodies. The invention is further concerned with a method of operating the melt-reducing facility wherein when, for example, two furnaces are being operated, the secondary combustion rate in the furnaces is increased to decrease the amount of heat of the combustible gases per a furnace and when one furnace is being operated, the secondary combustion rate in the furnace is decreased to double the amount of heat of the combustible gases in one furnace, so that the total amount of heat of combustible gases of the two furnaces remains constant at all times.

7 Claims, 5 Drawing Sheets

FURNACE A    FURNACE B

MELT-REDUCING FACILITY AND METHOD OF OPERATION THEREOF

TECHNICAL FIELD

The present invention relates to a melt-reducing facility for directly producing molten iron or molten pig iron by throwing iron bearing material, carbon material and flux into a melt-reducing furnace and blowing pure oxygen and/or an oxygen-rich gas thereinto, and to a method of operation thereof.

BACKGROUND ART

The melt-reduction is a method of directly producing molten iron or molten pig iron by throwing iron bearing material, carbon material and flux into a furnace body, blowing pure oxygen and/or an oxygen-rich gas thereinto, and reducing iron oxides of the iron bearing material in the slag. According to this method, combustible gases at temperatures as high as about 1600 to 1800° C. are produced from the melt-reducing furnace.

In general, the method of melt-reduction of this kind can be divided into a two-stage method according to which pre-reduced iron bearing material, carbon material and flux are thrown into the furnace body, and the iron ore is pre-reduced with a CO gas and an $H_2$ gas contained in the combustible gases generated from the furnace body, and a single-stage method according to which unreduced iron bearing material, carbon material and flux are thrown into the furnace body, iron oxides in the iron bearing material are reduced in the slag, a CO gas and an $H_2$ gas in the combustible gases generated from the furnace body are completely burned in a waste heat boiler, and the sensible heat and the latent heat of the combustible gases are recovered by vaporization to generate. electricity (see, for example, Japanese Unexamined Patent Publications (Kokai) No. 1-502276, No. 63-65011, No. 63-65007, etc.).

The two-stage method has an advantage of better energy efficiency than the single-stage method, but requires a pre-reducing furnace such as of a packed bed type or a fluidized bed type, causing the facility to become complex, requiring an increased investment for the facility, and imposing limitation on the shape of iron bearing material due to uniform reaction in the pre-reducing furnace (e.g., the packed bed system permits the use of massive iron bearing material only, and the fluidized bed system permits the use of powdery iron bearing material only). In recent years, therefore, a simple single-stage method has drawn attention.

It has been widely known that in the single-stage method, the energy efficiency is improved, i.e., the unit requirement of carbon material is decreased by increasing the rate of combustion of CO gas and $H_2$ gas generated in the slag (hereinafter referred to as secondary combustion rate in the furnace, which is defined to be $(CO_2\%+H_2O\%)/(CO_2\%+CO\%+H_2O\%+H_2\%)$) in a space in the furnace over the slag to effectively transmit the heat of combustion to the slag, and that the amount of heat of the combustible gases, i.e., the sum of the sensible heat and the latent heat generated from the furnace body, decreases by an amount by which the unit requirement of carbon material is decreased.

Figure 4:
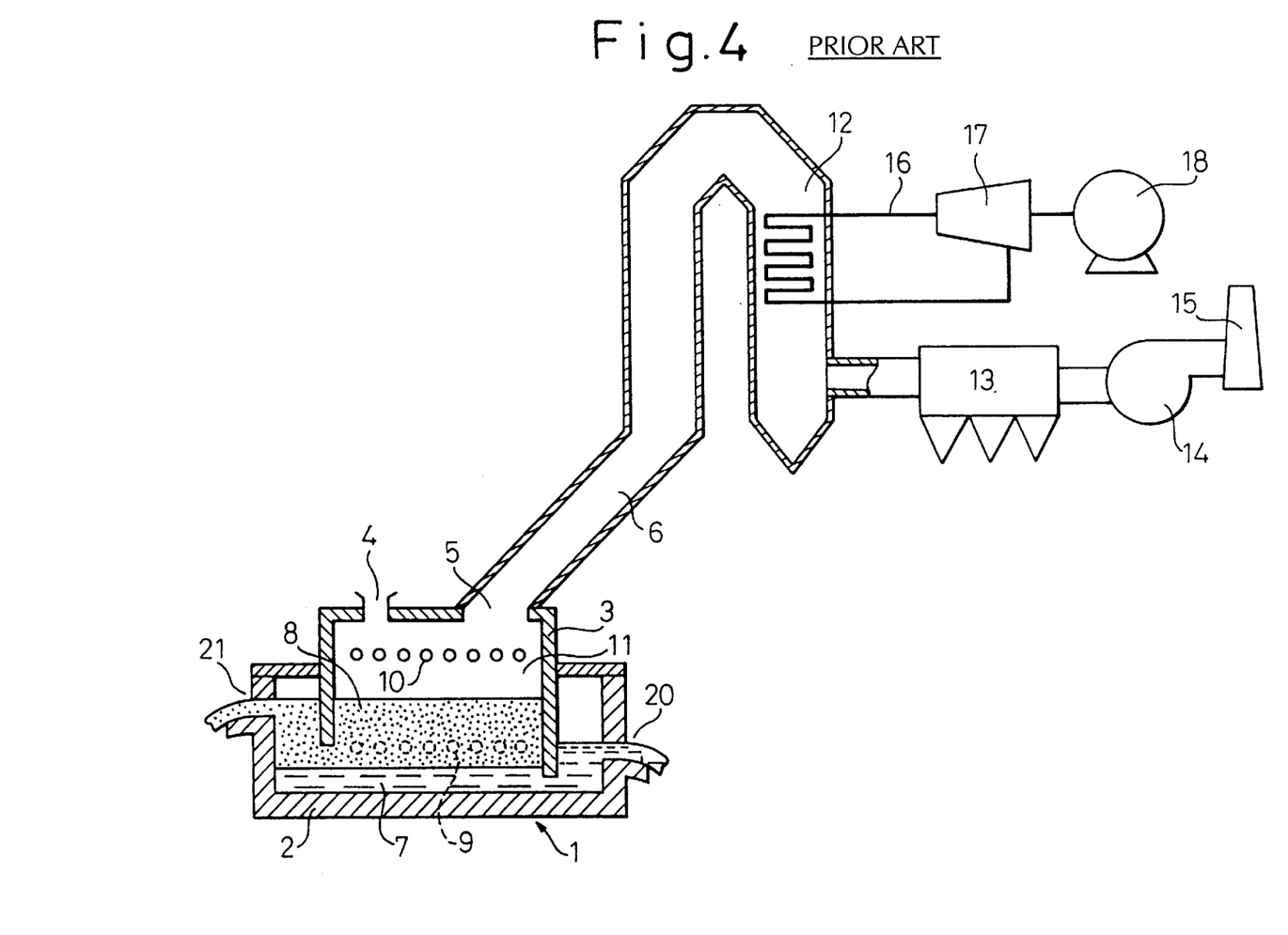
FIG. 4 is a front sectional view schematically illustrating a prior art.

In the single-stage method as shown in FIG. 4, what is important is to compensate for the energy efficiency which is inferior to that of the two-stage method by recovering by vaporization the sensible heat and the latent heat of combustible gases generated in large amounts from the furnace body to generate electric power which can be sold to the utility or which can be used in other facilities in the factory, contributing to decreasing the amount of electric power that must be purchased.

Figure 5:
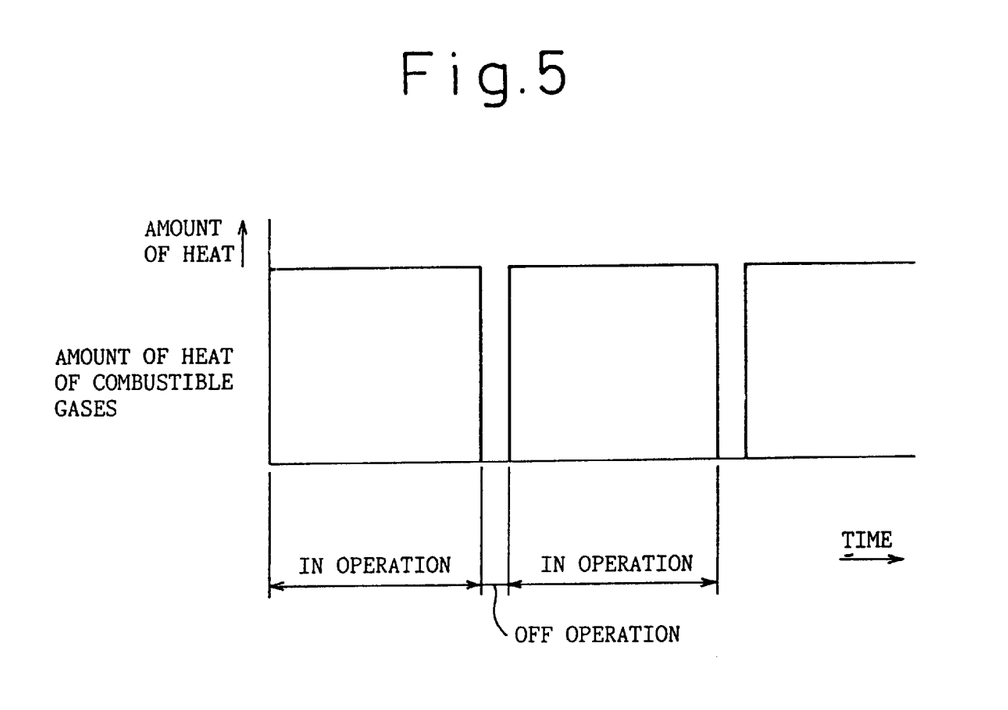
FIG. 5 is a diagram illustrating a relationship between the time and the amount of heat of combustible gases of when a conventional furnace is operated and halted.

In order to repair furnace body refractories of the melt-reducing furnace, however, the operation must be halted at regular intervals, e.g., once in three to twelve months as shown in FIG. 5. That is, no electricity is generated during the period in which the operation is halted leaving a problem from the standpoint of stably supplying electric power. For example, when the electric power is to be sold to the utility, the price must be set low or when the electric power is to be used in other facilities in the factory, operation of the other facilities in the factory is interrupted.

The present invention was accomplished in order to solve the above-mentioned problems, and its object is to stably supply the electric power even when the operation is regularly halted in order to repair furnace body refractories in the melt-reducing furnace.

DISCLOSURE OF THE INVENTION

The present invention is concerned with a melt-reducing facility for directly producing molten iron or molten pig iron by throwing iron bearing material, carbon material and flux into furnace bodies and blowing pure oxygen and/or an oxygen-rich gas thereinto, wherein a waste heat boiler and a power-generating facility are connected to a plurality of furnace bodies through ducts which can be freely opened and closed, the waste heat boiler being capable of recovering by vaporization the sensible heat and the latent heat of the combustible gases generated from the furnace bodies. The invention is further concerned with a method of operating the melt-reducing facility wherein when, for example, two furnaces are being operated, the secondary combustion rate in the furnaces is increased to decrease the amount of heat of the combustible gases per a furnace and when one furnace is being operated, the secondary combustion rate in the furnace is decreased to double the amount of heat of the combustible gases in one furnace, so that the amount of heat of when one furnace is operated becomes the same as the total amount of heat of the combustible gases of the two furnaces.

That is, in the melt-reducing furnace of the present invention, a plurality of furnaces, e.g., two furnaces, furnace A and furnace B, are normally operated. When the operation of the furnace A is halted for repairing, the furnace B only is operated. When the operation of the furnace B is halted for repairing, the furnace A only is operated. Thus, the electric power generated by utilizing the waste heat is continuously supplied without being interrupted.

When both the furnace A and the furnace B are normally operated, the secondary combustion rate in the furnace is increased to decrease the amount of heat of the combustible gases per a furnace. When the furnace A only or the furnace B only is operated, the secondary combustion rate in the furnace is decreased to double the amount of heat of the combustible gases in the furnace, so that the amount of heat becomes the same as the total amount of heat of the combustible gases of the two furnaces. It is thus made possible to constantly supply the electric power by utilizing waste heat.

BEST MODE FOR CARRYING OUT THE INVENTION

An embodiment of the invention will now be described with reference to FIG. 1 to FIGS. 3(A), 3(B) and 3(C).

This embodiment deals with a melt-reducing facility having two furnace bodies, a waste heat boiler which recovers by vaporization the sensible heat and the latent heat of the combustible gases generated from the furnace bodies, and a power-generating facility. It need not be pointed out that the present invention can further be adapted to a melt-reducing facility having three or more furnace bodies.

Described below with reference to FIGS. 1 and 2, first, are the furnace condition and the gas flow of when both a furnace A and a furnace B are operated in a 1-boiler 2-furnace melt-reducing facility according to the present invention. The melt-reducing furnace has two furnaces, i.e., furnace A and furnace B, the furnace bodies 1-$a$ and 1-$b$ having a shell lined with refractories 2-$a$ and 2-$b$ and water cooling panels 3-$a$ and 3-$b$. At upper portions of the furnace bodies 1-$a$ and 1-$b$ are formed starting material throw ports 4-$a$ and 4-$b$ for throwing iron bearing material, carbon material and flux, as well as gas discharge ports 5-$a$ and 5-$b$ for discharging combustible gases generated from the furnace bodies.

On the bottoms of the furnace bodies 1-$a$ and 1-$b$ are held molten pig iron 7-$a$, 7-$b$, and on the molten pig iron is held slag 8-$a$ and 8-$b$ having a specific gravity smaller than that of the molten pig iron 7-$a$, 7-$b$. The molten pig iron 7-$a$ and 7-$b$ is drained through iron spouts 20-$a$ and 20-$b$, and the slag 8-$a$ and 8-$b$ is drained through slag spouts 21-$a$ and 21-$b$ either continuously or intermittently.

Iron oxides (FeO and $Fe_2O_3$) in the iron bearing material thrown through the starting material throw ports 4-$a$ and 4-$b$ are reduced in the slag 8-$a$ and 8-$b$ with carbon component in the carbon material thrown through the starting material throw ports according to the following formulas (1) and (2), $$FeO+C \rightarrow Fe+CO(\text{endothermic reaction}) \qquad (1)$$

$$Fe_2O_3+3C \rightarrow 2Fe+3CO(\text{endothermic reaction}) \qquad (2)$$

Part of the carbon component in the carbon material thrown through the starting material throw ports 4-$a$ and 4-$b$ passes through the furnace bodies 1-$a$ and 1-$b$, and is oxidized with oxygen blown into the slag 8-$a$ and 8-$b$ through lower tuyeres 9-$a$ and 9-$b$ arranged facing the slag 8-$a$ and 8-$b$, according to the reaction of the following formula (3), $$C+1/2O_2 \rightarrow CO(\text{exothermic reaction}) \qquad (3)$$

The energy efficiency of the melt-reducing furnace, i.e., the unit requirement of carbon material is determined by the sum of carbon components required for the reactions of the formulas (1), (2) and (3).

Furthermore, the CO gas generated in the slag 8-$a$ and 8-$b$ as expressed by the above-mentioned formulas (1), (2) and (3) and hydrogen component in the carbon material, pass through the furnace bodies 1-$a$ and 1-$b$, and are oxidized with oxygen that is blown into the secondary combustion zones 11-$a$ and 11-$b$ through upper tuyeres 10-$a$ and 10-$b$ arranged facing the secondary combustion zones, according to the reactions of the following formulas (4) and (5), $$CO+1/2O_2 \rightarrow CO_2(\text{exothermic reaction}) \qquad (4)$$

$$H_2+1/2O_2 \rightarrow H_2O(\text{exothermic reaction}) \qquad (5)$$

The reactions of the formulas (4) and (5) are called secondary combustion in the furnace. It has been widely known that the degree of the secondary combustion is expressed by the secondary combustion rate in the furnace as defined by the following formula (6), and that the secondary combustion rate increases with an increase in the flow rate of oxygen that is blown into the secondary combustion zones 11-$a$ and 11-$b$ through the upper tuyeres 10-$a$ and 10-$b$, $$\text{Secondary combustion rate in the furnace} = (CO_2\%+H_2O\%)/ (CO_2\%+CO\%+H_2O\%+H_2\%) \qquad (6)$$

where $CO_2\%$, $CO\%$, $H_2O\%$ and $H_2\%$ represent volume percentages of the components of the combustible gases in the gas discharge ports 6-$a$ and 6-$b$.

Upon increasing the secondary combustion rate in the Furnace, the reaction heat in the secondary combustion zones 11-$a$ and 11-$b$ represented by the formulas (4) and (5) is partly transmitted to the slags 8-$a$ and 8-$b$. Upon decreasing the carbon component necessary for the exothermic reaction in the slag represented by the formula (3), the unit requirement of carbon material decreases and the amount of heat of the combustible gases decreases.

Figure 1:
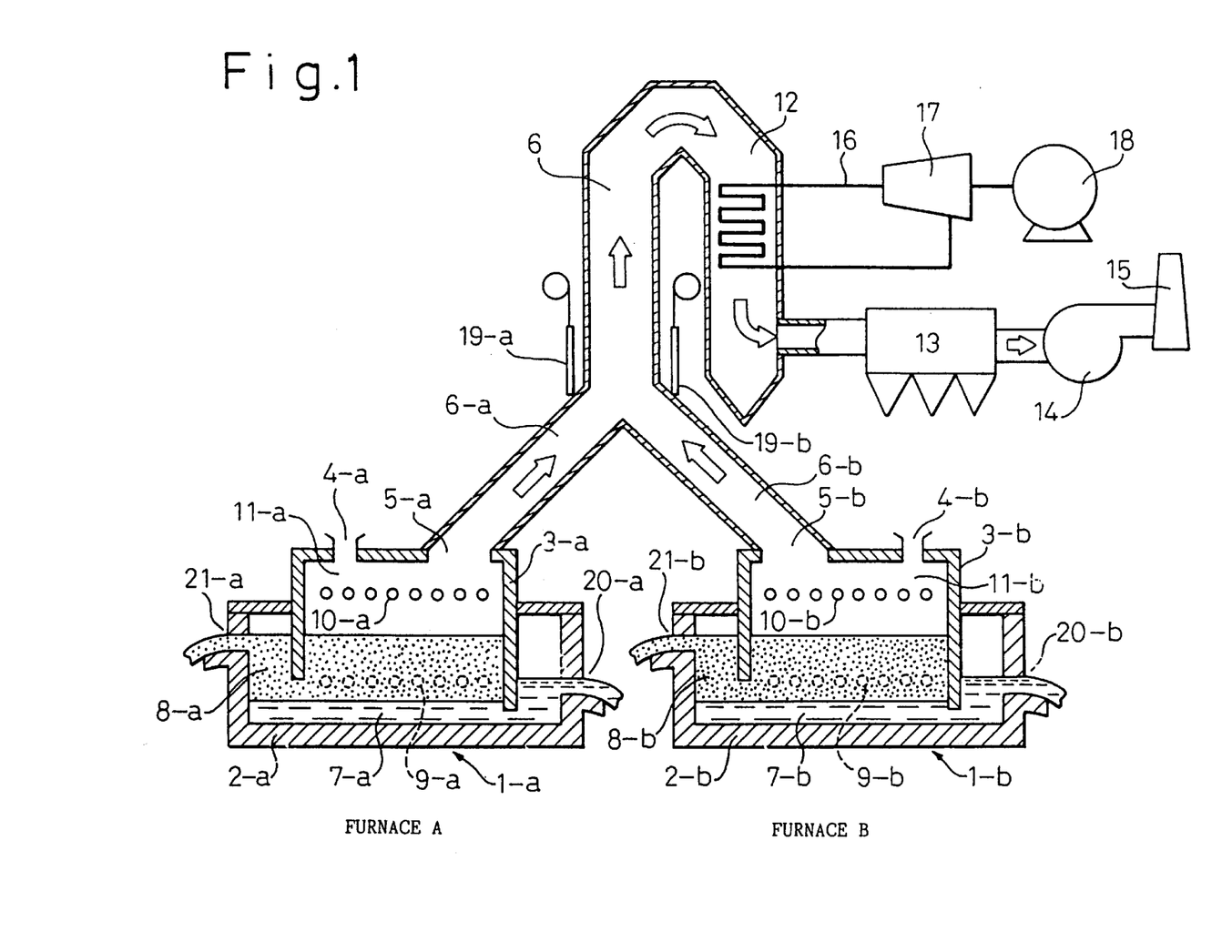
FIG. 1 is a front sectional view schematically illustrating an embodiment of the present invention.

FIG. 1 illustrates a state where both the furnace A and the furnace B are being operated. The combustible gases of high temperatures generated from the furnace A and the furnace B are guided into a waste heat boiler 12 passing through gas discharge ports 5-$a$ and 5-$b$ disposed at upper portions of the furnace bodies 1-$a$ and 1-$b$, discharge gas ducts 6-$a$ and 6-$b$, discharge gas dampers 19-$a$ and 19-$b$ which are both being opened, and a combined discharge gas duct 16. After sensible heat and latent heat are recovered by vaporization, the combustible gases are discharged out of the system through a dust collector 13, blower 14 and chimney 15. On the other hand, the vapor at a high pressure generated in the waste heat boiler 12 being heated by sensible heat and latent heat of the combustible gases, is guided into a turbine 17 through a vapor conduit 16 and is transformed into electric power by a generator 18.

Figure 2:
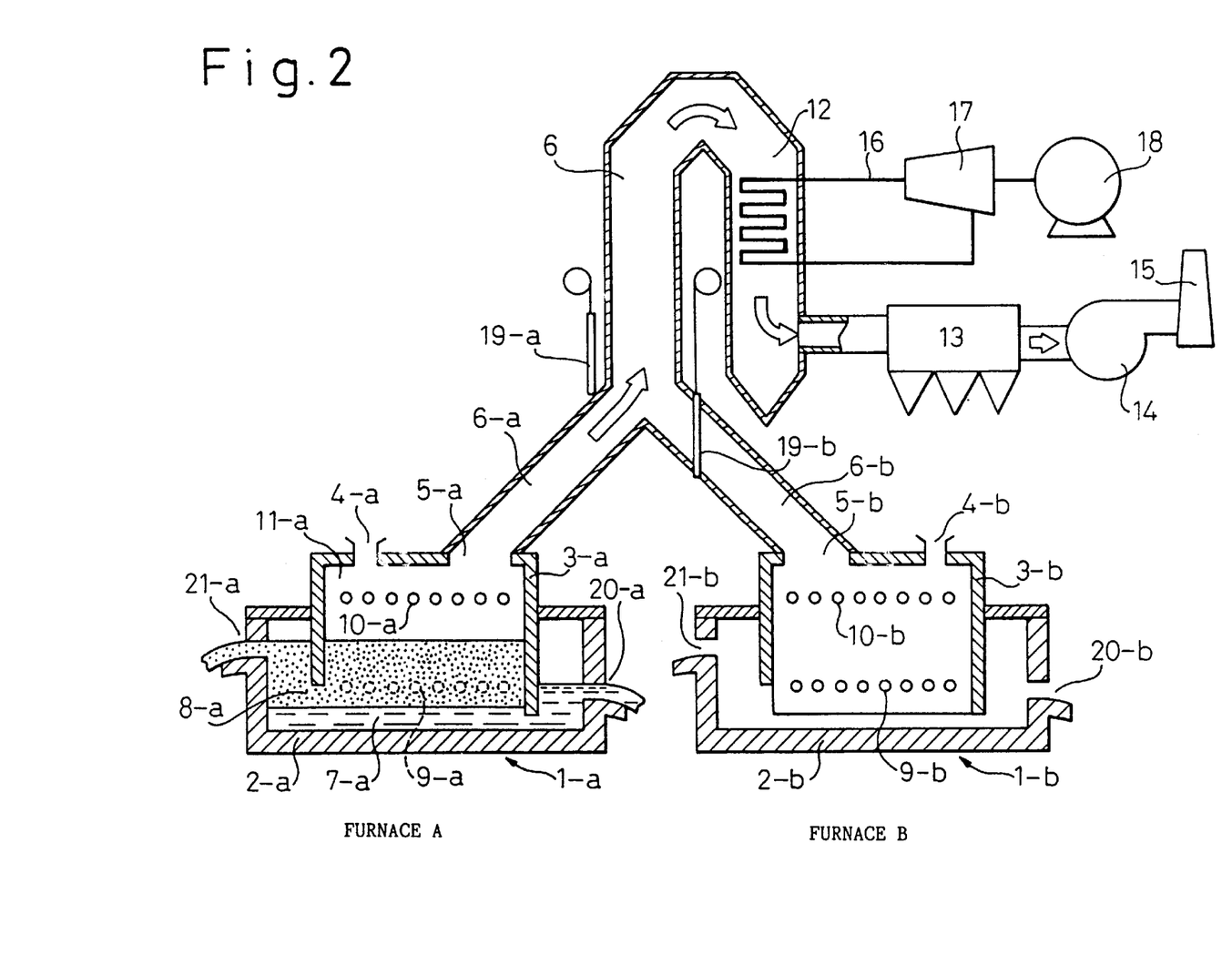
FIG. 2 is a front sectional view schematically illustrating another embodiment of the present invention.

FIG. 2 illustrates a state where the furnace A is in operation and the furnace B is not in operation. The combustible gases of high temperatures generated from the furnace A are guided into the waste heat boiler 12 passing through a gas discharge port 5-$a$ disposed at the upper portion of the furnace body 2-$a$, a discharge gas duct 6-$a$ and a discharge gas damper 19-$a$ which is opened. After the sensible heat and the latent heat are recovered by vaporization, the combustible gases are discharged out of the system through the dust collector 13, blower 14 and chimney 15.

On the other hand, the vapor at a high pressure generated in the waste heat boiler 12 being heated by the sensible heat and the latent heat of the combustible gases, is guided into the turbine 17 through the vapor conduit 16 and is transformed into electric power by the generator 18. In this case, the exhaust gas damper 19-b is closed. Therefore, even when the furnace B is not in operation, none of the operation of the furnace A or the recovery of sensible heat and latent heat of the combustible gases by vaporization is hindered.

EMBODIMENT

Described below is an embodiment of operation of a melt-reducing facility having two furnace bodies (furnace A and furnace B), a waste heat boiler, and a power-generating facility.

First, the two furnaces of furnace A and furnace B were operated in an ordinary manner. In this case, first, the total amount of heat of the combustible gases of the two furnaces was set to be 300 Gcal/h, the amount of power generation was set to be 120 KW that corresponds to the above amount of heat, the iron bearing material and carbon material were thrown in amounts as shown in Table 1, a pure oxygen gas was blown at a rate of 28,000 m³/h in terms of the amount of oxygen through the upper tuyere, and the combustible gases generated from the furnace bodies were burned at a high secondary combustion rate (70%) in the secondary combustion zones in the furnace.

As a result, the total amount of heat of the combustible gases of the two furnaces was 304 Gcal/h as shown in Table 1, and the amount of electric power generated was 124 KW.

Next, as shown in FIG. 2, the operation of the furnace B was halted, and iron bearing material and carbon material were fed into the furnace A only in amounts as shown in Table 1. A target value of the amount of heat of the obtained combustible gases was set to be 300 Gcal/h as in the case when the two furnaces were operated, a pure oxygen gas was blown at a rate of 24,000 m³ in terms of the amount of oxygen through the upper tuyere, and the combustible gases generated from the furnace body were burned at a low secondary combustion rate (40%) in the secondary combustion zone in the furnace.

As a result, the amount of heat of the obtained combustible gases was 304 Gcal/h as shown in Table 1, and the amount of electric power generated was 124 KW.

Thus, the amount of electric power generated by operating one furnace was the same as the amount of electric power generated by operating the two furnaces. Therefore, the electric power could be stably supplied despite the operation of the furnace B being halted.

Figure 3A:
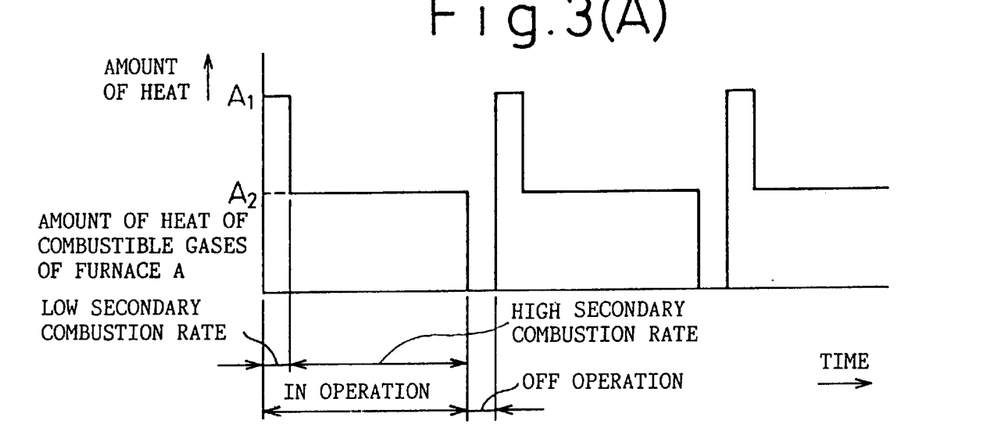
FIGS. 3(A) and 3(B) are diagrams illustrating a relationship between the amount of heat of combustible gases and the time of when the two furnaces are operated and halted according to the present invention.
Figure 3B:
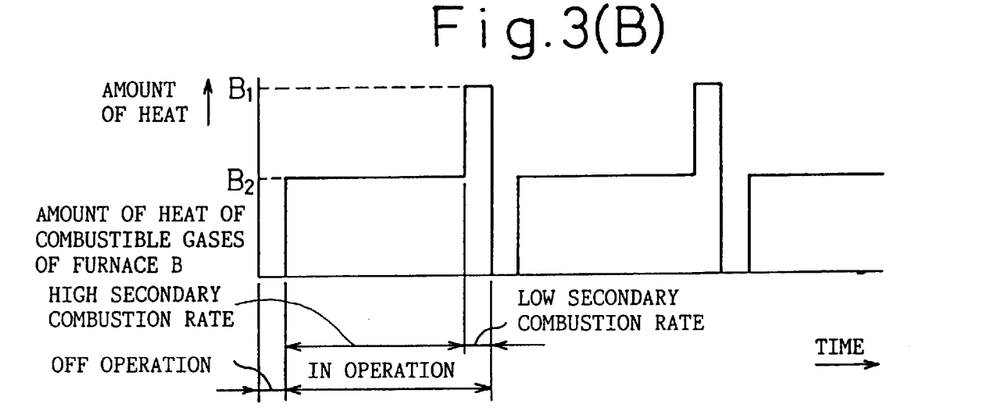

FIGS. 3(A) and 3(B) illustrate relationships between the operation time and the amount of heat of the combustible gases under the above-mentioned operation conditions.

Referring, first, to FIG. 3(B), the operation of the furnace B was halted for a predetermined period of time and, during this period, the combustible gases were burned at a low secondary combustion rate in the furnace A to increase the amount of heat to Al as shown in FIG. 3(A), which was then supplied to the waste heat boiler.

Then, the two furnaces of furnace A and furnace B were operated, the combustible gases were burned at a high secondary combustion rate in these furnaces, and the total amount of heat Az and heat $B_2$ was supplied to the waste heat boiler.

Then, as shown in FIG. 3(A), operation of the furnace A was halted for a predetermined period of time and during this period, the combustible gases were burned at a low secondary combustion rate in the furnace B to increase the amount of heat to $B_1$ as shown in FIG. 3(B), which was then supplied to the waste heat boiler.

Figure 3C:
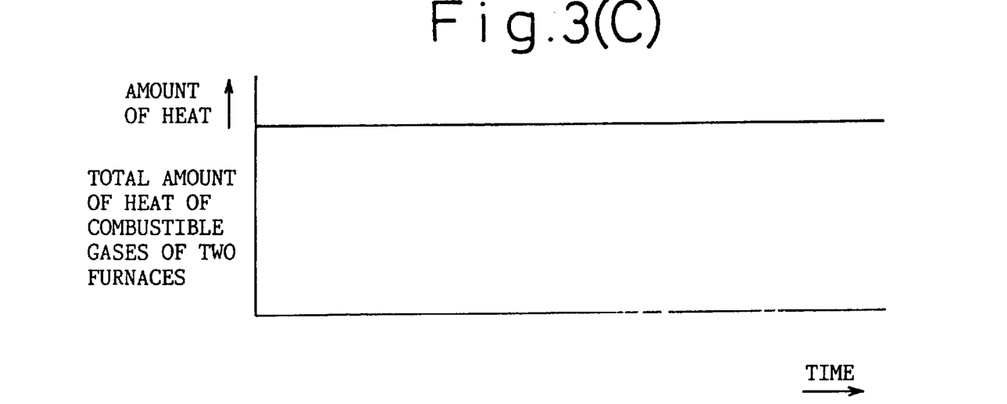
FIG. 3(C) is a diagram illustrating a relationship between the time and the total amount of heat of combustible gases of the two furnaces of the present invention.

By repeating the above-mentioned operation, a constant amount of heat was obtained from the combustible gases throughout the operation times of the two furnaces as shown in FIG. 3(C).

TABLE 1

|  |  | When two furnaces were operated | When one furnace was operated |
|---|---|---|---|
| Secondary combustion rate |  | High | Low |
| Amount of iron bearing material (tons/h) | Per 1 furnace | 69.0 | 69.0 |
|  | A total of 2 furnaces | 138.0 | 69.0 |
| Amount of carbon material (tons/h) | Per 1 furnace | 38.6 | 58.8 |
|  | A total of 2 furnaces | 77.2 | 58.8 |
| Amount of heat of waste gases (Gcal/h) | Per 1 furnace | 152 | 304 |
|  | A total of 2 furnaces | 304 | 304 |
| Amount of power generated (KW) | A total of 2 furnaces | 124 | 124 |

INDUSTRIAL APPLICABILITY

In the melt-reducing furnace of the present invention, both the furnace A and the furnace B are usually operated. When the operation of the furnace A is halted for repair, the furnace B only is operated. When the operation of the furnace B is halted for repair, the furnace A only is operated. Furthermore, when both the furnace A and the furnace B are operated, the secondary combustion rate is increased in the furnaces to decrease the amount of heat of the combustible gases in each furnace. When either the furnace A or the furnace B is operated, the secondary combustion rate is decreased in the furnace to double the amount of heat of the combustible gases in the furnace. Thus, the total amount of heat of the combustible gases of the two furnaces is set to be constant. Accordingly, the following effects can be expected.

(1) The electric power can be sold to the utility is at an increased price.

(2) The electric power can be used by other facilities in the premises without hindering their operation.

(3) Even when the operation of either furnace is halted for repair, the molten pig iron can be supplied to a step after the step of making molten pig iron.

What is claimed is:

1. A melt-reducing facility for directly producing molten iron or molten pig iron, comprising:
   a plurality of melt-reducing furnaces having a starting material throw port for throwing iron bearing material, carbon material and flux;
   a discharge gas duct structure forming a combined discharge gas duct by combining discharge gas ducts of said plurality of furnaces, each of said discharge gas ducts having a discharge gas damper;
   a waste heat boiler and a power-generating facility provided in said combined discharge gas duct;
   a tuyere provided in each of the furnaces for blowing pure oxygen and/or oxygen-rich gas to adjust total amount of heat from combustible gases generated from each of the furnaces; and
   means for adjusting total amount of heat of combustible gases generated to be constant.

2. A melt-reducing facility according to claim 1, wherein a blower is provided at an end portion of said combined waste gas duct via a dust collector.

3. A method of operating a melt-reducing facility having a power-generating facility and a waste heat boiler provided in a combined discharge gas duct in which are combined discharge gas ducts of a plurality of melt-reducing furnaces, comprising the steps of:

setting, to a predetermined value, the amount of heat of combustible gases generated from said melt-reducing furnaces and guided into said waste heat boiler;

opening the discharge gas dampers of the furnaces, throwing iron bearing material, carbon material and the like into the furnaces, melt-reducing iron bearing material by blowing pure oxygen and/or an oxygen-rich gas through upper and lower tuyeres, and secondarily burning said combustible gases in the secondary combustion zones of the furnaces;

adjusting total amount of heat of combustible gases generated to be constant by adjusting the secondary combustion rate by adjusting the rate of blowing pure oxygen and/or the oxygen-rich gas through said upper tuyere at the time of effecting the secondary combustion, so that the total amount of heat of said combustible gases becomes equal to said predetermined amount of heat of said combustible gases; and guiding the combustible gases generated from the furnaces into the waste heat boiler through the combined discharge gas duct.

4. A method of operating a melt-reducing facility according to claim 3 wherein, in effecting said secondary combustion, said pure oxygen and/or said oxygen-rich gas is blown in an increased amount through said upper tuyere to increase the secondary combustion rate and to decrease the amount of heat of the combustible gases per each furnace, so that the total amount of heat of the combustible gases of the two furnaces become equal to said predetermined amount of heat of the combustible gases.

5. A method of operating a melt-reducing facility having a power-generating facility and a waste heat boiler provided in a combined discharge gas duct in which are combined discharge gas ducts of a plurality of melt-reducing furnaces, comprising the steps of:

setting, to a predetermined value, the amount of heat of combustible gases generated from said melt-reducing furnaces and guided into said waste heat boiler;

opening the discharge gas dampers of the furnaces (one or more furnaces) other than the furnace which has stopped operating among said plurality of furnaces, throwing iron bearing material, carbon material and the like into said furnaces, melt-reducing iron bearing material by blowing pure oxygen and/or an oxygen-rich gas through upper and lower tuyeres, and secondarily burning said combustible gases in the secondary combustion zones of the furnaces;

adjusting total amount of heat of combustible gases generated to be constant by adjusting the secondary combustion rate by adjusting the rate of blowing pure oxygen and/or the oxygen-rich gas through said upper tuyere at the time of effecting the secondary combustion, so that the total amount of heat of said combustible gases becomes equal to said predetermined amount of heat of said combustible gases; and guiding the combustible gases generated from the furnaces into the waste heat boiler through the combined discharge gas duct.

6. A method of operating a melt-reducing facility according to claim 5 wherein, in effecting said secondary combustion, said pure oxygen and/or said oxygen-rich gas is blown in a decreased amount through said upper tuyere to decrease the secondary combustion rate and to increase the amount of heat of the combustible gases per each furnace, so that the amount of heat of the combustible gases becomes equal to said predetermined amount of heat of the combustible gases.

7. A method of operating a melt-reducing facility having a power-generating facility and a waste heat boiler provided in a combined discharge gas duct in which are combined discharge gas ducts of two melt-reducing furnaces, comprising the steps of:

setting, to a predetermined value, the amount of heat of combustible gases generated from said melt-reducing furnaces and guided into said waste heat boiler;

when both of said two melt-reducing furnaces are operated, adjusting total amount of heat of combustible gases generated to be constant by increasing the secondary combustion rate in each of the furnaces so that the amount of heat of the combustible gases in each furnace becomes one half said predetermined amount of heat of the combustible gases;

when either one of said two melt-reducing furnaces is operated, adjusting total amount of heat of combustible gases generated to be constant by decreasing the secondary combustion rate in the furnace, so that the amount of heat of the combustible gases in the furnace becomes twice as great as the amount of heat of the combustible gases in each furnace when said two furnaces are both operated, so as to accomplish said predetermined amount of heat of the combustible gases; and guiding the combustible gases having the same amount of heat at all times into the waste heat boiler via the combined discharge gas duct irrespective of the operation condition of the two melt-reducing furnaces.

* * * * *

UNITED STATES PATENT AND TRADEMARK OFFICE
CERTIFICATE OF CORRECTION

PATENT NO. : 6,200,518 B1
DATED : March 13, 2001
INVENTOR(S) : Hiroshi Ichikawa

Page 1 of 1

It is certified that error appears in the above-identified patent and that said Letters Patent is hereby corrected as shown below:

Column 1,
Line 35, delete the period after "generate".
Line 66, change "the" at the end of line to -- a --.

Column 2,
Lines 35 and 53, delete "a" before "furnace".

Column 3,
Line 23, delete "It need not be pointed out".
Line 24, delete "that" at beginning of line and change "the" to -- The --.

Column 5,
Line 53, change "A1" to -- $A_1$ --.
Line 55, change "$A_z$" to -- $A_2$ --.

Signed and Sealed this

Twenty-seventh Day of November, 2001

Attest:

Nicholas P. Godici

NICHOLAS P. GODICI
Attesting Officer *Acting Director of the United States Patent and Trademark Office*